US009631112B2

(12) United States Patent
Hoffmann et al.

(10) Patent No.: US 9,631,112 B2
(45) Date of Patent: *Apr. 25, 2017

(54) POLYURETHANE COATING MATERIAL COMPOSITION, MULTI-STAGE COATING METHODS, AND ALSO THE USE OF THE COATING MATERIAL COMPOSITION

(71) Applicant: BASF Coatings GmbH, Münster (DE)

(72) Inventors: Peter Hoffmann, Senden (DE); Benedikt Schnier, Telgte (DE)

(73) Assignee: BASF Coatings GmbH, Muenster (DE)

( * ) Notice: Subject to any disclaimer, the term of this patent is extended or adjusted under 35 U.S.C. 154(b) by 135 days.

This patent is subject to a terminal disclaimer.

(21) Appl. No.: 14/416,818

(22) PCT Filed: Jun. 4, 2013

(86) PCT No.: PCT/EP2013/061451
§ 371 (c)(1),
(2) Date: Jan. 23, 2015

(87) PCT Pub. No.: WO2014/016026
PCT Pub. Date: Jan. 30, 2014

(65) Prior Publication Data
US 2015/0247050 A1   Sep. 3, 2015

Related U.S. Application Data

(60) Provisional application No. 61/675,357, filed on Jul. 25, 2012.

(30) Foreign Application Priority Data

Jul. 25, 2012 (EP) .................................... 12177761

(51) Int. Cl.
B32B 27/40     (2006.01)
C09D 125/14    (2006.01)
C08G 18/62     (2006.01)
C08G 18/79     (2006.01)
C08G 18/80     (2006.01)
C08G 18/18     (2006.01)
C09D 175/04    (2006.01)
C08G 18/28     (2006.01)
B05D 5/00      (2006.01)
B05D 7/00      (2006.01)

(52) U.S. Cl.
CPC .......... C09D 125/14 (2013.01); B05D 5/005 (2013.01); B05D 7/536 (2013.01); C08G 18/1883 (2013.01); C08G 18/289 (2013.01); C08G 18/6254 (2013.01); C08G 18/792 (2013.01); C08G 18/809 (2013.01); C09D 175/04 (2013.01); Y10T 428/31935 (2015.04)

(58) Field of Classification Search
CPC C08G 18/6254; C08G 18/792; C08G 18/809; C08G 18/1883; C09D 175/04; Y10T 428/31935
See application file for complete search history.

(56) References Cited

U.S. PATENT DOCUMENTS

| | | | |
|---|---|---|---|
| 4,598,131 A | 7/1986 | Prucnal | |
| 4,939,213 A | 7/1990 | Jacobs, III et al. | |
| 5,084,541 A | 1/1992 | Jacobs, III et al. | |
| 5,516,559 A | 5/1996 | Rockrath et al. | |
| 5,716,678 A | 2/1998 | Rockrath et al. | |
| 6,084,026 A | 7/2000 | Jamasbi | |
| 6,403,699 B1 | 6/2002 | Rockrath et al. | |
| 8,013,099 B2 | 9/2011 | Poppe et al. | |
| 8,486,539 B2 | 7/2013 | Klein et al. | |
| 8,569,438 B2 | 10/2013 | Groenewolt et al. | |
| 8,679,589 B2 | 3/2014 | Groenewolt et al. | |
| 8,808,805 B2 | 8/2014 | Groenewolt et al. | |
| 8,898,895 B2 | 12/2014 | Ueki et al. | |
| 9,139,751 B2 * | 9/2015 | Westhoff | C08G 18/163 |
| 9,340,638 B2 * | 5/2016 | Westhoff | C08G 18/16 |
| 9,340,703 B2 * | 5/2016 | Hoffmann | C08G 18/163 |
| 2003/0027921 A1 | 2/2003 | Speier et al. | |

(Continued)

FOREIGN PATENT DOCUMENTS

| | | |
|---|---|---|
| CN | 1201808 | 12/1998 |
| CN | 101952337 | 1/2010 |
| DE | 102005045228 | 4/2007 |
| DE | 102008060454 | 6/2010 |
| EP | 0008127 | 2/1980 |
| EP | 0249201 | 12/1987 |
| EP | 0624577 | 11/1994 |

(Continued)

OTHER PUBLICATIONS

STIC Search Report dated Jul. 6, 2016.*
PCT International Preliminary Report on Patentability in PCT/EP2013/061451, mailed Feb. 5, 2015, 7 pages.
PCT International Search Report in PCT/EP2013/061451, mailed Aug. 9, 2013, 3 pages.
Partial English translation of Japanese Patent Appln. Publication No. S56-26962 dated Mar. 16, 1981, 6 pages.
Partial English translation of Japanese Patent Appln. Publication No. S56-41265 dated Apr. 17, 1981, 3 pages.

Primary Examiner — Eisa Elhilo
(74) Attorney, Agent, or Firm — Servilla Whitney LLC

(57) ABSTRACT

Described are nonaqueous coating material compositions comprising (A) at least one polyhydroxyl group-containing compound, (B) at least one polyisocyanate group-containing compound having free or blocked isocyanate groups, (D) at least one amine-blocked phosphoric acid or phosphonic acid compound as a catalyst and (S) at least one monomeric aromatic optionally substituted carboxylic acid whose carboxyl group is in conjugation with a π-electron system, wherein the component (B) comprises at least one structural unit —NR—(X—SiR"x(OR')3-x) (II), and/or at least one structural unit —N(X—SiR"x(OR')3-x)n(X'—SiR"y(OR')3-y)m (III). Also described are multistage coating methods, and use of the coating material compositions.

15 Claims, No Drawings

(56) References Cited

U.S. PATENT DOCUMENTS

| | | |
|---|---|---|
| 2005/0182189 A1 | 8/2005 | Ohrbom et al. |
| 2011/0045190 A1* | 2/2011 | Groenewolt ....... C08G 18/1883 427/385.5 |
| 2012/0100380 A1 | 4/2012 | Groenewolt |
| 2014/0161981 A1 | 6/2014 | Westhoff et al. |
| 2014/0162074 A1 | 6/2014 | Westhoff et al. |
| 2014/0308451 A1 | 10/2014 | Westhoff et al. |
| 2014/0322448 A1 | 10/2014 | Hoffmann et al. |

FOREIGN PATENT DOCUMENTS

| | | |
|---|---|---|
| EP | 0626888 | 12/1994 |
| EP | 0692007 | 1/1996 |
| EP | 0276501 | 8/1998 |
| EP | 0994117 | 4/2000 |
| EP | 1273640 | 1/2003 |
| JP | S5626962 A | 3/1981 |
| JP | S5641265 A | 4/1981 |
| JP | H10338769 A | 12/1998 |
| JP | 2007063281 A | 3/2007 |
| WO | WO-93/15849 | 8/1993 |
| WO | WO-94/22968 | 10/1994 |
| WO | WO-94/22969 | 10/1994 |
| WO | WO-97/12945 | 4/1997 |
| WO | WO-01/09260 | 2/2001 |
| WO | WO-01/98393 | 12/2001 |
| WO | WO-2004/029121 | 4/2004 |
| WO | WO-2008/074489 | 6/2008 |
| WO | WO-2008/074490 | 6/2008 |
| WO | WO-2008/074491 | 6/2008 |
| WO | WO-2009/077180 | 6/2009 |
| WO | WO-2009/077181 | 6/2009 |
| WO | WO-2010/149236 | 12/2010 |
| WO | WO-2012/123161 | 9/2012 |
| WO | WO-2012/123166 | 9/2012 |
| WO | WO-2012/123198 | 9/2012 |
| WO | WO-2012/126796 | 9/2012 |
| WO | WO-2013/110712 | 8/2013 |

\* cited by examiner

US 9,631,112 B2

POLYURETHANE COATING MATERIAL COMPOSITION, MULTI-STAGE COATING METHODS, AND ALSO THE USE OF THE COATING MATERIAL COMPOSITION

CROSS-REFERENCE TO RELATED APPLICATIONS

This is application is the National Stage Entry of PCT/EP2013/061451, filed Jun. 4, 2013, which claims priority to U.S. Provisional Application Ser. No. 61/675,357, filed Jul. 25, 2012, and European Patent Application 12177761.9, filed Jul. 25, 2012, the disclosures of which are incorporate herein by reference in their entireties.

TECHNICAL FIELD

The present invention relates to coating material compositions comprising at least one polyhydroxyl group-containing compound (A), at least one polyisocyanate group-containing compound (B), and as catalyst (D) at least one amine-blocked phosphoric acid compound.

The present invention additionally provides multistage coating methods using these coating material compositions, and also the use of the coating material compositions as clearcoat material and/or pigmented coating material, and use of the coating method for automotive refinish and/or for the coating of parts for installation in or on automobiles, of plastics substrates and/or of utility vehicles.

BACKGROUND

Polyurethane coating materials typically comprise a catalyst, and in this context not only acidic compounds but also, in particular, tertiary amines and/or metallic compounds, such as various tin compounds, for example, more particularly dibutyltin dilaurate and dibutyltin oxide, are employed.

The employment of tin-containing catalysts is to be avoided in coating materials, as elsewhere, because of the toxicity inherent in many tin compounds. The EU Commission's Working Group on Classification and Labelling" have categorized dibutyltin oxide (DBTO) and dibutyltin dilaurate (DBTL) accordingly.

WO04/029121 describes polyurethane compositions which are stabilized in terms of the reactivity of the composition by addition of acids with a pKa range between 2.8 and 4.5, these acids being able to be utilized at the same time as catalyst. Acids used in this context and with a pKa range between 2.8 and 4.5 include, for example, benzoic acid, hydroxybenzoic acid, salicylic acid, phthalic acid, and so on. The compositions preferably comprise no further catalyst, although in addition it is also possible to use the typical known polyurethane catalysts, such as tertiary amines or amidines or organometallic compounds, such as tin compounds more particularly. Where amines are used as catalyst, it is necessary to employ great care in the selection of the type of amine and its amount, since the aminic catalysts are able in part to eliminate the stabilizing action of the organic acids added.

Further, EP-A-1 273 640 describes 2-component coating materials comprising a polyol component and a crosslinker component, consisting of aliphatic and/or cycloaliphatic polyisocyanates or the polyisocyanates derived from them by polymerization, allophanatization, biuretization or urethaneization, where 0.1 to 95 mol % of the originally free isocyanate groups present have reacted with bisalkoxysilylamine. These coating materials can be used for OEM finishing and, following their complete curing, exhibit good scratch resistance in conjunction with high resistance towards environmental influences. Nevertheless, these coating materials have a particularly strong propensity towards ongoing crosslinking, which means that the scratch resistance of the coatings—directly after thermal curing to completion—is no more than inadequate. In addition, the severe ongoing crosslinking has adverse consequences for the weathering stability, since the risk of stress cracks is increased.

Furthermore, WO 2001/98393, WO08/74491, WO 08/74490, WO 08/74489, WO09/077181 and WO 10/149236 disclose coating material compositions which comprise at least one hydroxyl-containing compound (A), at least one compound (B) containing isocyanate groups and silane groups, and a catalyst suitable for the crosslinking of the silane groups. Catalysts used are phosphorus-containing catalysts, more particularly phosphorus- and nitrogen-containing catalysts. These coating material compositions have the advantage over conventional polyurethane coating materials of a significantly enhanced scratch resistance in conjunction with good weathering stability. In need of improvement, however, is the curing of the coating material compositions at low cure temperatures, of the kind generally employed for automotive refinishing and/or for the coating of plastics substrates and/or utility vehicles.

WO09/077180, moreover, describes coating material compositions of the aforementioned kind that comprise the at least one hydroxyl-containing compound (A), at least one compound (B) comprising isocyanate groups and silane groups, and, as catalyst (D), at least one phosphoric acid compound blocked with an amine, the amine used comprising more particularly bicyclic amines, preferably diazabicyclooctane; this does improve the curing at low cure temperatures, in relation to the coating materials of WO 2001/98393, WO08/74491, WO 08/74490, WO 08/74489, WO09/077181 and WO 10/149236, but even faster curing under the conditions of refinishing and the finishing of utility vehicles is desirable, and so the coatings after curing at 60° C. for just 30 minutes should exhibit a level of curing such that initial assembly operations or demasking can be performed without damage to the coating.

Finally, PCT patent applications PCT/EP2012/052284, PCT/EP2012/051444, PCT/EP2012/051574, PCT/EP2012/054546, not yet laid open, and European patent application No. 12152406.0, not yet laid open, describe coating material compositions which as well as at least one polyhydroxyl group-containing compound (A), at least one polyisocyanate group-containing compound (B) and at least one catalyst (D) based on a zinc-amidine complex, also comprise at least one monomeric aromatic, optionally substituted carboxylic acid (S), whose carboxyl group is conjugated with a π-electron system.

SUMMARY

Provided, therefore, are coating material compositions, more particularly for automotive refinish and for the coating of utility vehicles, that ensure good assembly strength after just a very short time, meaning that they ensure rapid curing even under the conditions of refinish and of the finishing of utility vehicles, in other words, after curing at 60° C. for 30 minutes, already have undergone curing to an extent such that initial assembly operations or demasking operations can be carried out without damage to the coating. At the same time, however, the coating material compositions, at room temperature and after mixing of the binder component with the isocyanate component, have a good potlife of at least 2 hours. As used herein, the term "Potlife" refers to the period of time within which the coating material composition has attained twice its initial viscosity. Moreover, in one or more embodiments, the coating material compositions lead to coatings exhibiting good through-curing and sufficient ultimate hardness. Furthermore, these coating materials do not to show any color changes before and after curing. High demands are placed on the intrinsic color of the systems, particularly in the field of clearcoat materials in the automobile industry. Thus the catalyst of one or more embodiments neither must exhibit any intrinsic color and nor must it lead to discoloring at mixing or during curing of the coating material when the catalyst is mixed with the typical components of a coating material.

Furthermore, in one or more embodiments, the catalyst is able to be added to the binder component of the coating material composition from the outset. However, this admixing of the catalyst to the binder component from the outset does not to cause any adverse effect on the shelflife thereof. Furthermore, in one or more embodiments, the catalyst is insensitive to hydrolysis, since even in systems in organic solution, the typically high concentration of hydroxyl groups can result in a reduction in catalyst activity over the storage period. Especially in the automotive refinish segment, an extremely long shelflife even at relatively high temperatures is an advantage.

Moreover, in one or more embodiments, the coating material compositions lead to coatings which have a high degree of scratch resistance and more particularly a high gloss retention after scratch exposure, and lead to a highly weathering-stable network, while at the same time ensuring high acid resistance. Moreover, the coatings and paint systems, especially the clearcoat systems, are able to be produced even in film thicknesses >40 µm without stress cracks appearing. Furthermore, a good overall visual appearance, as it is known, is ensured.

Lastly, the new coating materials of one or more embodiments are able to be prepared simply and with very good reproducibility, and do not cause any environmental problems during application.

DETAILED DESCRIPTION

In one or more embodiments, provided are nonaqueous coating material compositions comprising
(A) at least one polyhydroxyl group-containing compound (A),
(B) at least one polyisocyanate group-containing compound (B) having free or blocked isocyanate groups, which has at least one structural unit of the formula (I)

  (I), and/or at least one structural unit of the formula (II)

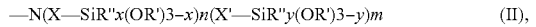  (II), wherein
R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms, R''=alkyl, cycloalkyl, aryl, or aralkyl, it being possible for the carbon chain to be interrupted by nonadjacent oxygen, sulfur or NRa groups, where Ra=alkyl, cycloalkyl, aryl or aralkyl, preferably R''=alkyl radical, more particularly having 1 to 6 C atoms,
n=0 to 2, m=0 to 2, m+n=2, and x, y=0 to 2,
and
(D) as catalyst (D) at least one phosphoric acid compound blocked with an amine or phosphonic acid compound blocked with an amine, or mixtures of these compounds, wherein the coating material composition further comprises
(S) at least one monomeric aromatic optionally substituted carboxylic acid (S) whose carboxyl group is in conjugation with a π-electron system.

In one or more embodiments, provided are multistage coating methods using these coating material compositions, and also the use of the coating material compositions as clearcoat material and/or pigmented coating material, and use of the coating method for automotive OEM finishing, automotive refinish and/or for the coating of parts for installation in or on automobiles, of plastics substrates and/or of utility vehicles.

It is surprising and was not foreseeable that the coating material compositions ensure good assembly strength after just a very short time under the conditions for automotive refinish, in other words they ensure rapid curing even under the conditions of refinish, thus being tack-free as soon as possible after curing at 60° C. At the same time, at room temperature and after mixing of the binder component with the isocyanate component, however, the coating material compositions exhibit a good potlife of at least 2 hours. Potlife, as used herein, refers to the period of time within which the coating material composition has attained twice its initial viscosity.

Moreover, in one or more embodiments, the coating material compositions lead to coatings having good through-curing and a sufficient ultimate hardness. Furthermore, in one or more embodiments, the catalyst does not exhibit an intrinsic color, nor does it lead, with the conventional coating components, to a discoloration at mixing or during curing of the coating material.

Furthermore, in one or more embodiments, the catalyst can be added to the binder component of the coating material composition from the outset without adversely affecting the shelflife of the binder-containing component of the coating material composition. Furthermore, the catalyst is insensitive to hydrolysis, and so the typically high concentration of hydroxyl groups does not result in any reduction in the catalyst activity over the storage period, even in systems in organic solution, and this is an advantage especially in the automotive refinish segment.

In one or more embodiments, the coating material compositions also lead to coatings which have a high degree of scratch resistance and in particular exhibit high gloss retention after scratch exposure.

Furthermore, the coating material compositions lead to a highly weathering-stable network and at the same time ensure high acid resistance of the coatings. Moreover, the coatings and paint systems, especially the clearcoat systems, can be produced even in film thicknesses>40 µm without stress cracks appearing. Also, furthermore, a good overall visual appearance, as it is known, is ensured.

Lastly, the new coating material compositions can be prepared easily and with very good reproducibility, and do not cause any environmental problems during application.

The Coating Material

In particular, the coating materials of one or more embodiments are thermally curable coating materials, i.e. coating materials which are substantially free of radiation-curable unsaturated compounds, in particular are completely free of radiation-curable unsaturated compounds.

The Polyhydroxyl Group-containing Compound (A)

As polyhydroxyl group-containing compound (A), in one or more embodiments, it is possible to use all compounds known to the skilled person which have at least 2 hydroxyl groups per molecule and are oligomeric and/or polymeric. As component (A) it is also possible to use mixtures of different oligomeric and/or polymeric polyols.

In one or more embodiments, the oligomeric and/or polymeric polyols (A) have mass-average molecular weights Mw>500 daltons, measured by means of gel permeation chromatography (GPC) against a polystyrene standard, particularly between 800 and 100,000 daltons, more particularly between 1000 and 50,000 daltons.

In one or more specific embodiments, the oligomeric and/or polymeric polyols (A) are polyester polyols, polyurethane polyols, polysiloxane polyols, polyacrylate polyols and/or polymethacrylate polyols, and also copolymers thereof, referred to below as polyacrylate polyols.

In one or more embodiments, the polyols have an OH number of 30 to 400 mg KOH/g, more particularly between 100 and 300 KOH/g. The hydroxyl number (OH number) indicates the number of mg of potassium hydroxide that are equivalent to the amount of acetic acid bound by 1 g of substance on acetylation. For the determination, the sample is boiled with acetic anhydride-pyridine and the resultant acid is titrated with potassium hydroxide solution (DIN 53240-2). In the case of pure poly(meth)acrylates, the OH number may also be determined with sufficient accuracy by calculation on the basis of the OH-functional monomers used.

In one or more embodiments, the glass transition temperatures, measured by means of DSC measurement in accordance with DIN EN ISO 11357-2, of the polyols are between −150 and 100° C., more particularly between −120° C. and 80° C.

Suitable polyester polyols are described in EP-A-0 994 117 and EP-A-1 273 640, for example. In one or more embodiments, polyurethane polyols are prepared by reaction of polyester polyol prepolymers with suitable di- or polyisocyanates, and are described in EP-A-1 273 640, for example. Suitable polysiloxane polyols are described in WO-A-01/09260, for example, and the polysiloxane polyols recited therein may be employed preferably in combination with other polyols, more particularly those having higher glass transition temperatures.

In very specific embodiments, component (A) comprises one or more polyacrylate polyols and/or polymethacrylate polyols. Together with the polyacrylate polyol(s) and/or polymethacrylate polyol(s) it is possible for other oligomeric and/or polymeric polyhydroxyl group-containing compounds to be employed, examples being polyester polyols, polyurethane polyols, and polysiloxane polyols, especially polyester polyols. In one or more specific embodiments, component (A) consists of one or more polyacrylate polyols and/or polymethacrylate polyols.

In one or more embodiments, the poly(meth)acrylate polyols that are used are generally copolymers and have mass-average molecular weights Mw of between 1000 and 20,000 daltons, more particularly between 1500 and 10,000 daltons, in each case measured by means of gel permeation chromatography (GPC) against a polystyrene standard.

In one or more embodiments, the glass transition temperature of the copolymers is generally between −100 and 100° C., more particularly between −60 and <20° C. (measured by means of DSC measurements in accordance with DIN-EN-ISO 11357-2).

In one or more specific embodiments, the poly(meth) acrylate polyols have an OH number of 60 to 300 mg KOH/g, more particularly between 70 and 200 KOH/g, and also an acid number of between 0 and 30 mg KOH/g.

The hydroxyl number (OH number) is determined as described above (DIN 53240-2). The acid number here indicates the number of mg of potassium hydroxide consumed for the neutralization of 1 g of the compound in question (DIN EN ISO 2114).

In one or more embodiments, as hydroxyl-containing monomer building blocks hydroxyalkyl acrylates and/or hydroxyalkyl methacrylates, such as more particularly 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate are used.

In one or more embodiments, as further monomer building blocks for the poly(meth)acrylate polyols, alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate are used.

As further monomer building blocks for the poly(meth) acrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

Hydroxyl-containing Compounds (C)

Optionally, in one or more embodiments, in addition to the polyhydroxyl group-containing component (A), the coating material compositions of the invention may further comprise one or more monomeric, hydroxyl-containing compounds (C), different from component (A). These compounds (C) preferably occupy a fraction of 0% to 20% by weight, more preferably of 0% to 10% by weight, very preferably of 1% to 5% by weight, based in each case on the binder fraction of the coating material composition.

As hydroxyl group-containing compound (C), use is made of low molecular mass polyols.

Low molecular mass polyols used are, for example, diols, such as ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol, and also polyols, such as trimethylolethane, trimethylolpropane, trimethylolhexane, 1,2,4-butanetriol, pentaerythritol, and dipentaerythritol. Preference is given to admixing low molecular mass polyols of this kind in minor fractions to the polyol component (A).

The Polyisocyanate Group-containing Compounds (B)

In one or more embodiments, the di- and/or polyisocyanates serving as parent structures for the isocyanate group-containing compounds (B) are substituted or unsubstituted aromatic, aliphatic, cycloaliphatic and/or heterocyclic polyisocyanates that are known per se. Examples of polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g. Desmodur® W from Bayer AG), tetramethylxylyl diisocyanates (e.g., TMXDI® from American Cyanamid), and mixtures of the aforementioned polyisocyanates. Further specific polyisocyanates are the isocyanurate trimers and/or allophanate dimers and/or biuret dimers and/or uretdione dimers of the aforementioned diisocyanates.

In another embodiment of the invention, the polyisocyanates are polyisocyanate prepolymers having urethane structural units, which are obtained by reaction of polyols with a stoichiometric excess of aforementioned polyisocyanates. Polyisocyanate prepolymers of this kind are described in U.S. Pat. No. 4,598,131, for example.

In one or more specific embodiments, polyisocyanate parent structures for component (B) are hexamethylene diisocyanate, isophorone diisocyanate and 4,4'-methylenedicyclohexyl diisocyanate and/or the isocyanurate trimer and/or allophanate dimer and/or biuret dimer and/or uretdione dimer thereof.

The polyisocyanates and/or their isocyanurate trimers and/or their allophanate dimers and/or their biuret dimers and/or their uretdione dimers that are used as component (B) further comprise at least one structural unit of the formula (I)

and/or at least one structural unit of the formula (II)

wherein
R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R"=alkyl, cycloalkyl, aryl, or aralkyl, it being possible for the carbon chain to be interrupted by nonadjacent oxygen, sulfur or NRa groups, where Ra=alkyl, cycloalkyl, aryl or aralkyl, preferably R"=alkyl radical, more particularly having 1 to 6 C atoms,
n=0 to 2, m=0 to 2, m+n=2, and x, y=0 to 2.

In one or more embodiments, the respective alkoxy radicals (OR') may be identical or different, but what is decisive for the structure of the radicals is the extent to which they influence the reactivity of the hydrolyzable silane groups. In specific embodiments, R' is an alkyl radical, more particularly having 1 to 6 C atoms. In very specific embodiments, radicals R' which increase the reactivity of the silane groups, i.e., represent good leaving groups, are used. Accordingly a methoxy radical is preferred over an ethoxy radical, which in turn is preferred over a propoxy radical. With particular preference, therefore, R'=ethyl and/or methyl, more particularly methyl.

The reactivity of organofunctional silanes may also, furthermore, be influenced considerably by the length of the spacers X, X' between silane functionality and organic functional group which serves for reaction with the constituent to be modified. Examples thereof that may be mentioned include the "alpha" silanes, which are obtainable from the company Wacker, and in which there is a methylene group, instead of the propylene group present in the case of "gamma" silanes, between Si atom and functional group.

In one or more embodiments, the components (B) used are functionalized with the structural units (I) and/or (II), and are obtained in particular by reaction of polyisocyanates and/or of isocyanurate trimers thereof and/or allophanate dimers thereof and/or biuret dimers thereof and/or uretdione dimers thereof with at least one compound of the formula (Ia)

and/or with at least one compound of the formula (IIa)

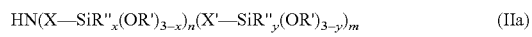

wherein the substituents have the definition given above.

In one or more embodiments, the components (B) used are functionalized with the structural units (I) and (II), and are obtained by reaction of polyisocyanates and/or of isocyanurate trimers thereof and/or allophanate dimers thereof and/or biuret dimers thereof and/or uretdione dimers thereof with at least one compound of the formula (Ia) and with at least one compound of the formula (IIa), wherein the substituents have the definition given above.

In one or more embodiments, compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. In specific embodiments bis(3-propyltrimethoxysilyl)amine is used. Aminosilanes of these kinds are available, for example, under the brand name DYNASYLAN® from DEGUSSA or Silquest® from OSI.

In one or more embodiments, compounds (Ia) are N-(2-(trimethoxysilyl)ethyl)alkylamines, N-(3-(trimethoxysilyl)propyl)alkylamines, N-(4-(trimethoxysilyl)butyl) alkylamines, N-(2-(triethoxysilyl)ethyl)alkylamines, N-(3-(triethoxysilyl)propyl)alkylamines and/or N-(4-(triethoxysilyl)butyl)alkylamines. In specific embodiments, N-(3-(trimethoxy-silyl)propyl)butylamine is used. Aminosilanes of these kinds are available, for example, under the brand name DYNASYLAN® from DEGUSSA or Silquest® from OSI.

In one or more embodiments, in component (B) between 10 and 90 mol %, specifically between 20 and 80 mol %, more specifically more than 30 and less than 70 mol %, and very specifically between 31 and 50 mol % of the isocyanate groups originally present have been converted into structural units (I) and/or (II).

In one or more embodiments, the amount of structural units (I) in component (B) is between 5 and 70 mol %, more specifically between 8 and 50 mol %, very specifically between 9 and 40 mol %, based in each case on the entirety of the structural units (I) plus (II), and the total amount of structural units (II) in component (B) is between 95 and 30 mol %, more specifically between 92 and 50 mol %, and very specifically between 91 and 60 mol %, based in each case on the entirety of the structural units (I) plus (II).

In one or more specific embodiments, the polyisocyanate component (B) for more than 25 mol % and less than 36 mol %, specifically between 26 and 35 mol %, of the isocyanate groups originally present are converted into structural units (II).

Especially preferred coating material compositions are obtained if in component (B) the total amount of structural units (I) is between 9 and 40 mol % and the total amount of structural units (II) is between 91 and 60 mol %, based in each case on the entirety of the structural units (I) plus (II), and between 31 and 50 mol % of the isocyanate groups originally present in (B) have been converted into structural units (I) and (II), and in component (B) between 26 and 35 mol % of the isocyanate groups originally present have been converted into structural units (II).

In one or more embodiments, the reaction of the isocyanate-group-containing compounds (B) with the compounds (Ia) and/or (IIa) takes place in an inert gas atmosphere at temperatures of not more than 100° C., specifically of not more than 60° C.

The free isocyanate groups of the isocyanate-group-containing compounds B may also be used in a blocked form. This is the case when the coating materials of the invention are used as one-component systems. For the blocking it is possible in principle to use any blocking agent which can be used for the blocking of polyisocyanates and has a sufficiently low deblocking temperature. Blocking agents of these kinds are very familiar to the skilled person. Preference is given to using blocking agents of the kind described in EP-A-0 626 888 and EP-A-0 692 007.

Catalyst (D)

In one or more embodiments, catalyst (D) used comprises at least one phosphoric acid compound which is blocked with an amine, or phosphonic acid compound blocked with an amine, or mixtures of these compounds (that is, mixtures of two or more phosphoric acid compounds blocked with an amine, mixtures of two or more phosphonic acid compounds blocked with an amine, or mixtures of one or more phosphoric acid compounds blocked with an amine with one or more phosphonic acid compounds blocked with an amine).

Examples of suitable amine-blocked phosphonic acid compounds are amine-blocked substituted phosphonic diesters and diphosphonic diesters, specifically from the group consisting of amine-blocked acyclic phosphonic diesters, amine-blocked cyclic phosphonic diesters, amine-blocked acyclic diphosphonic diesters, and amine-blocked cyclic diphosphonic diesters. Compounds of these kinds are described, for example, in German patent application DE-A-102005045228. In this context it is also possible to use mixtures of two or more different compounds.

Use is made more particularly as catalyst, however, of amine-blocked substituted phosphoric monoesters and/or amine-blocked substituted phosphoric diesters, specifically from the group consisting of amine-blocked acyclic phosphoric diesters and amine-blocked cyclic phosphoric diesters, more preferably amine adducts of the acyclic phosphoric monoesters and diesters.

These acyclic phosphoric diesters are selected more particularly from the group consisting of acyclic phosphoric diesters of the general formula (III):

wherein the radicals R10 and R11 are selected from the group consisting of:
substituted and unsubstituted alkyl having 1 to 20, specifically 2 to 16 and more specifically 2 to 10 carbon atoms, cycloalkyl having 3 to 20, specifically 3 to 16 and more specifically 3 to 10 carbon atoms, and aryl having 5 to 20, specifically 6 to 14 and more specifically 6 to 10 carbon atoms,
substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl and cycloalkylarylalkyl, the alkyl, cycloalkyl and aryl groups present therein each containing the above-recited number of carbon atoms, and
substituted and unsubstituted radical of the type recited above, containing at least one, more particularly one, heteroatom selected from the group consisting of oxygen atom, sulfur atom, nitrogen atom, phosphorus atom and silicon atom, more particularly oxygen atom, sulfur atom and nitrogen atom and may additionally also represent hydrogen (partial esterification).

In one or more specific embodiment, the catalyst (D) is selected from the group of amine-blocked phosphoric acid ethylhexyl partial esters and amine-blocked phosphoric acid phenyl partial esters, more particularly amine-blocked phosphoric acid bis(ethylhexyl) esters.

Examples of suitable amines with which the phosphoric acid compounds and/or the phosphonic acid compounds, more particularly the phosphoric esters, are blocked are, in particular, tertiary amines, examples being acyclic amines, such as dimethyldodecylamine or triethylamine, for example. Preference is given to using cyclic amines, more specifically bicyclic amines, such as diazabicyclooctane (DABCO), diazabicyclononene (DBN) or diazabicycloundecene (DBU), for example, and very specifically diazabicyclooctane (DABCO).

In one or more embodiments, for blocking the phosphoric esters tertiary amines which ensure high activity of the catalyst under the curing conditions of 60° C. are used. In one or more specific embodiments, cyclic amines, more particularly bicyclic amines are used. Examples of amines with which the phosphoric esters are preferably blocked, other than DABCO, include, for example, N-dimethylbenzylamine and N-methylmorpholine. Especially preferred as an amine for blocking the phosphonic acid compound and/or the phosphoric acid compound, more particularly for blocking the phosphoric acid compound, is the use of diazabicyclooctane (DABCO).

Monomeric Aromatic Carboxylic Acid (S)

It is further essential to the invention that the coating material composition comprises at least one monomeric aromatic, optionally substituted carboxylic acid (S) whose carboxyl group is in conjugation with a π-electron system. Here, the number of carboxyl groups may vary, the carboxylic acids preferably having one carboxyl group. The monomeric aromatic, optionally substituted carboxylic acids have a molecular weight <500 g/mol, more specifically <300 g/mol. In one or more embodiments, monomeric aromatic, optionally substituted carboxylic acids which have a pKa of 2 to 5 are used. The pKa corresponds to the pH at the half-equivalent point, the solution medium being preferably water. Should it not be possible for an acid to specify a pKa in water, then the medium selected is preferably DMSO or else another suitable medium in which the acid is soluble.

Suitability is possessed by monomeric aromatic monocarboxylic and polycarboxylic acids, the corresponding alkyl- and aryl-substituted aromatic monocarboxylic and polycarboxylic acids, and also the corresponding hydroxyl-containing aromatic monocarboxylic and polycarboxylic acids, such as, for example, phthalic acid and terephthalic acid, alkyl- and/or aryl-substituted phthalic acid and terephthalic acid, benzoic acid and alkyl- and/or aryl-substituted benzoic acid, aromatic carboxylic acids having further functional groups such as salicylic acid and acetylsalicylic acid, alkyl- and/or aryl-substituted salicylic acid or isomers thereof, polycyclic aromatic carboxylic acids, such as the isomers of naphthalenecarboxylic acid, and derivatives thereof.

As monomeric aromatic carboxylic acid (S), the coating material composition preferably comprises benzoic acid, tert-butylbenzoic acid, 3,4-dihydroxybenzoic acid, salicylic acid and/or acetylsalicylic acid, more preferably benzoic acid.

The Combination of Components (A), (B), Optionally (C), (D), and (S), and Also Further Components of the Coating Material Compositions Where the compositions are one-component coating material compositions, polyisocyanate group-containing compounds (B) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. With particular preference, the isocyanate groups of component (B) are used without blocking.

In the case of the 2-component (2K) coating material compositions, a coatings component comprising the polyhydroxyl group-containing compound (A) and also further components, described below, is mixed shortly before application of the coating material with a further coatings component, comprising the polyisocyanate group-containing compound (B) and also, optionally, other of the components described below, mixing taking place in a manner known per se; in general, the coatings component which comprises the compound (A) comprises the catalyst (D) and also a part of the solvent.

In one or more embodiments, the polyhydroxy component (A) may be present in a suitable solvent. Suitable solvents (L) are those which allow sufficient solubility of the polyhydroxy component and which, in the coating material, are chemically inert with respect to the compounds (A), (B), (D), (S) and optionally (C) and which also do not react with (A), optionally C, (B), (D) and (S) during the curing of the coating material.

Examples of such aprotic solvents (L) are mentioned further below.

In one or more embodiments, the weight fractions of the polyol (A) and optionally (C) and of the polyisocyanate (B) are selected such that the molar equivalents ratio of the hydroxyl groups of the polyhydroxyl group-containing compound (A) plus optionally (C) to the isocyanate groups of component (B) is between 1:0.9 and 1:1.5, specifically between 1:0.9 and 1:1.1, more specifically between 1:0.95 and 1:1.05.

In one or more embodiments, coating material compositions which comprise from 20% to 80% by weight, specifically from 30% to 70% by weight, of at least one polyhydroxyl group-containing compound (A), more particularly from 20% to 80% by weight, specifically from 30% to 70% by weight, of at least one polyhydroxyl group-containing polyacrylate (A) and/or at least one polyhydroxyl group-containing polymethacrylate (A), based in each case on the binder content of the coating material composition are used.

In one or more embodiments, coating material compositions which comprise from 5% to 79% by weight, specifically from 25% to 69% by weight, based in each case on the binder content of the coating material composition, of the polyisocyanate group-containing compound (B) are used.

In one or more embodiments, the coating material compositions further comprise 0.01% to 20% by weight, specifically 0.1% to 10% by weight, of at least one amine-blocked phosphoric acid compound and/or at least one amine-blocked phosphonic acid compound as catalyst (D), based in each case on the binder fraction of the coating material composition.

In one or more embodiments, the coating material compositions further comprise 0.2% to 15.0% by weight, specifically 0.5% to 8.0% by weight, and more specifically 0.5% to 5.0% by weight, of at least one aromatic carboxylic acid (S), the percentages by weight being based in each case on the binder content of the coating material composition.

By binder fraction is meant in each case the fraction of the coating material composition, prior to crosslinking, which is soluble in tetrahydrofuran (THF). For this purpose, a small sample (P) is weighed out and dissolved in 50 to 100 times the amount of THF, insoluble constituents are removed by filtration, the THF is evaporated off, and subsequently the solids of the previously THF-dissolved constituents is ascertained by drying the remaining sample at 130° C. for 60 minutes, cooling it in a desiccator, and then weighing it again. The residue corresponds to the binder content of the sample (P).

In one or more embodiments, the coating material compositions are nonaqueous coating materials and may comprise solvent or may be formulated as solvent-free systems.

In one or more embodiments, solvents (L) especially suitable for the coating material compositions are those which in the coating material are chemically inert towards the compounds (A) and (B) and which also do not react with (A) and (B) during the curing of the coating material. Examples of such solvents (L) are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers or mixtures of the aforementioned solvents. In one or more embodiments, the aprotic solvents or solvent mixtures have a water content of not more than 1% by weight, more specifically not more than 0.5% by weight, based on the solvent.

In one or more embodiments, the solvent or solvents (L) are used in the coating material compositions in an amount such that the solids content of the coating material composition is at least 50% by weight, more specifically at least 60% by weight.

Additionally, in one or more embodiments, the coating material compositions may comprise 0% to 30% by weight, specifically 0% to 15% by weight, based in each case on the binder content of the coating material composition, of one or more amino resins and/or one or more tris(alkoxycarbonylamino)triazines (E).

Examples of suitable tris(alkoxycarbonylamino)triazines are given in U.S. Pat. No. 4,939,213, in U.S. Pat. No. 5,084,541, and in EP-A-0 624 577.

Examples of suitable amino resins (E) are all of the amino resins typically used in the coating industry sector, the properties of the resultant coating materials being controllable via the reactivity of the amino resin. The resins are condensation products of aldehydes, especially formaldehyde, and, for example, urea, melamine, guanamine, and benzoguanamine. The amino resins comprise alcohol groups, preferably methylol groups, generally some of which, or preferably all of which, are etherified with alcohols. Use is made in particular of amino resins etherified with lower alcohols. Preference is given to using amino resins etherified with methanol and/or ethanol and/or butanol, examples being the products available commercially under the names Cymel®, Resimene®, Maprenal®, and Luwipal®.

The amino resins (E) are long-established compounds and are described in detail in, for example, the American patent application US 2005/0182189 A1, page 1, paragraph [0014], to page 4, paragraph [0028].

In one or more embodiments, the binder mixture and/or the coating material composition may further comprise at least one customary and known coatings additive (F) in effective amounts, i.e., in amounts specifically up to 30%, more specifically up to 25%, and more specifically up to 20%, by weight, based in each case on the binder content of the coating material composition.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
reactive diluents different from components (A) and (C), more particularly reactive diluents which become reactive only through reaction with further constituents and/or with water, such as Incozol® or aspartic esters, for example;
wetting agents different from components (A) and (C), such as siloxanes, fluorine-containing compounds, carboxylic monoesters, phosphoric esters, polyacrylic acids and their copolymers, or polyurethanes;
adhesion promoters;
flow control agents;
film-forming assistants such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheology control additives different from components (A) and (C), such as the additives known from patents WO 94/22968, EP-A-0 276 501, EP-A-0 249 201 or WO 97/12945; crosslinked polymeric microparticles, of the kind disclosed in EP-A-0 008 127, for example; inorganic phyllosilicates such as aluminum magnesium silicates, sodium magnesium and sodium magnesium fluorine lithium phyllosilicates of the montmorillonite type; silicas such as Aerosils®; or synthetic polymers having ionic and/or associative groups, such as poly(meth)acylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;
flame retardants.

In one or more specific embodiments, coating material compositions comprise
30% to 70% by weight, based on the binder content of the coating material composition, of at least one polyhydroxyl group-containing polyacrylate (A) and/or at least one polyhydroxyl group-containing polymethacrylate (A),
25% to 69% by weight, based on the binder content of the coating material composition, of the polyisocyanate group-containing compound (B),
0% to 10% by weight, based on the binder content of the coating material composition, of the hydroxyl-containing component (C),
0.5% to 5.0% by weight, based on the binder content of the coating material composition, of at least one aromatic carboxylic acid (S),
0% to 15% by weight, based on the binder content of the coating material composition, of one or more amino resins and/or one or more tris(alkoxycarbonylamino)triazines (E),
0% to 20% by weight, based on the binder content of the coating material composition, of at least one customary and known coatings additive (F) and
0.1% to 10% by weight of at least one amine-blocked phosphoric acid compound and/or at least one amine-blocked phosphonic acid compound as catalyst (D).

In a further embodiment of the invention, the binder mixture or coating material composition of the invention may further comprise other pigments and/or fillers and may serve for producing pigmented topcoats and/or pigmented undercoats or primer-surfacers, more particularly pigmented topcoats. The pigments and/or fillers that are used for these purposes are known to the skilled person. The pigments are typically used in an amount such that the pigment-to-binder ratio is between 0.05:1 and 1.5:1, based in each case on the binder content of the coating material composition.

Since the coatings of the invention produced from the coating materials of the invention also adhere outstandingly to already-cured electrocoat finishes, surfacer finishes, basecoat finishes or customary and known clearcoat finishes, they are outstandingly suitable not only for use in automotive OEM (production-line) finishing but also for automotive refinish and/or for the coating of parts for installation in or on automobiles and/or for the coating of utility vehicles.

The coating material compositions of the invention may be applied by all of the customary application methods, such as spraying, knifecoating, spreading, pouring, dipping, impregnating, trickling or rolling, for example. In the course of such application, the substrate to be coated may itself be at rest, with the application equipment or system being moved. Alternatively, the substrate to be coated, more particularly a coil, may be moved, with the application system being at rest relative to the substrate or being moved appropriately.

Preference is given to employing spray application methods, such as, for example, compressed-air spraying, airless spraying, high-speed rotation, electrostatic spray application (ESTA), alone or in conjunction with hot spray application such as, for example, hot-air spraying.

The applied coating materials of the invention can be cured after a certain rest time. The rest time serves, for example, for the flow and devolatization of the coating films or for the evaporation of volatile constituents such as solvents. The rest time may be assisted and/or shortened by use of elevated temperatures and/or by a reduced atmospheric humidity, provided that this does not entail any damage to or change in the coating films, such as premature complete crosslinking, for instance.

There are no peculiarities of method as far as the thermal curing of the coating materials is concerned; this curing instead takes place in accordance with the customary and known methods such as heating in a forced-air oven or irradiation with IR lamps. Thermal curing here may also take place in stages. Another preferred method of curing is that using near infrared (NIR radiation).

Thermal curing takes place advantageously at a temperature of 20 to 200° C. for a time of 1 minute up to 10 hours, and even longer cure times may be employed at low temperatures. For automotive refinish and for the painting of plastics parts, and also for the finishing of utility vehicles, it is usual to employ relatively low temperatures, which are preferably between 20 and 80° C., more particularly between 20 and 60° C.

The coating material compositions of the invention are outstandingly suitable for use as decorative, protective and/or effect coatings and finishes on bodywork of means of transport (more particularly motor vehicles, such as cycles, motorcycles, buses, trucks or automobiles) or of parts thereof; of the interior and exterior of edifices; of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

Consequently, the coating material compositions of the invention can be applied, for example, to an uncoated or precoated substrate, the coating materials of the invention being either pigmented or unpigmented. The coating material compositions and finishes of the invention, more particularly the clearcoat finishes, are employed more particularly in the technologically and esthetically particularly demanding field of automotive OEM finishing and for the coating of plastics parts for installation in or on automobile bodies, more particularly for top-class automobile bodies, such as, for example, for producing roofs, tailgates, engine cowlings, fenders, bumpers, spoilers, sills, protective strips, side trim, and so on, and also for automotive refinish and for the finishing of utility vehicles, such as, for example, of trucks, chain-driven construction vehicles, such as crane vehicles, wheel loaders, and concrete mixers, buses, rail vehicles, watercraft, aircraft, and also agricultural equipment such as tractors and combines, and parts thereof.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, specifically used with a polycarbonate fraction >40%, more particularly >50%.

ASA refers generally to impact-modified styrene-acrylonitrile polymers wherein graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

In one or more embodiments, the coating material compositions of the invention are used in multistage coating methods, more particularly in methods which involve applying, to an uncoated or precoated substrate, first a pigmented basecoat film and thereafter a coat with the coating material composition of the invention. The invention accordingly also provides multicoat effect and/or color coating systems comprising at least one pigmented basecoat film and, disposed thereon, at least one clearcoat film, wherein the clearcoat film has been produced from the coating material composition of the invention.

Not only water-thinnable basecoats but also basecoats based on organic solvents may be used. Suitable basecoats are described in, for example, EP-A-0 692 007 and the documents cited therein at column 3, lines 50 et seq. Preferably, the applied basecoat is first dried, which means that, in an evaporation phase, at least some of the organic solvent and/or the water is removed from the basecoat film. Drying takes place preferably at temperatures from room temperature to 80° C. After drying has taken place, the coating material composition of the invention is applied. The two-coat finish is then preferably baked, under conditions employed in automotive OEM finishing, at temperatures from 20 to 200° C. for a time from 1 minute up to 10 hours, and even longer curing times may be employed in the case of the temperatures employed for automotive refinish, which are generally between 20 and 80° C., more particularly between 20 and 60° C.

In another specific embodiment of the invention, the coating material composition of the invention is used as a transparent clearcoat for the coating of plastics substrates, more particularly of plastics parts for installation in or on other articles. These plastics parts are preferably likewise coated in a multistage coating method, which involves applying, to an uncoated or precoated substrate or to a substrate which has been pretreated for improved adhesion of the subsequent coatings (for example, by flaming, corona treatment or plasma treatment of the substrate), first a pigmented basecoat film and thereafter a coat with the coating material composition of the invention.

EXAMPLES

Gel Permeation Chromatography (GPC)

The gel permeation chromatography was carried out at 40° C. using a high-pressure liquid chromatography pump and a refractive-index detector. The eluent used was tetrahydrofuran, with an elution rate of 1 ml/min. The calibration was carried out by means of polystyrene standards. The number-average molecular weight Mn, the weight-average molecular weight Mw, and Mp were ascertained, the polydispersity index Mp being calculated from Mp=Mw/Mn.

Hydroxyl Number

The hydroxyl number is calculated via the fraction of OH-functional components used and expressed in mg of KOH per gram of resin solids.

Solids Determination

Approximately 1 g of sample is weighed out into a tin plate lid. Following addition of around 3 ml of butyl acetate, the sample is dried in a drying cabinet at 130° C. for 60 minutes, cooled in a desiccator, and then weighed again. The residue corresponds to the solids fraction.

Binder Content Determination

The binder fraction means in each case that fraction of the coating material composition that is soluble in tetrahydrofuran (THF), prior to crosslinking. For its determination, a small sample (P) is weighed out, dissolved in 50 to 100 times the amount of THF, insoluble constituents are removed by filtration, the THF is evaporated off, and then the solids of the constituents previously dissolved in THF is ascertained by drying at 130° C. for 60 minutes, cooling in a desiccator, and then repeat weighing. The residue corresponds to the binder content of the sample (P).

Freedom from Tack by the Zapon Tack Test (ZTT):

An aluminum strip with a thickness of 0.5 mm, a width of 2.5 cm, and a length of 11 cm is bent at an angle of 110° to give a surface measuring 2.5×2.5 cm. The long side of the metal plate is bent, after a further 2.5 cm, by about 15°, so that the plate is just held in balance by a weight (5 g) placed in the center of the square area. For the measurement of the ZTT tack-free state, the bent plate is placed on the coating film and weighed down with a 100 g weight for 30 seconds. Following removal of the weight, the coating is considered tack-free if the metal angle falls over within 5 s. The test is repeated at intervals of 15 minutes. Before the test is deployed, the tackiness of the coating film is assessed qualitatively by touch. In the case of tests at elevated temperature, the test panels are stored at room temperature for 10 minutes for cooling before the test is commenced. Freedom from tack was measured with the Zapon tack test by curing the coating for 30 min at 60° C. and beginning the test after storing the panels for 10 minutes at room temperature, and freedom from tack was measured with the Zapon tack test while keeping the coating at room temperature.

Print Test:

The coating film is drawn down using a 100 micrometer applicator onto a glass plate. After drying at 60° C. for 15 minutes or drying at 60° C. for 30 min, the glass plate, within a period of 10 minutes following removal from the oven, is placed on a commercial laboratory balance. Using thumb pressure, the film is then loaded with a weight of 2 kg for 20 seconds. This test is repeated every 10 minutes. In the case of a coating film which is obviously still soft or tacky, the coating film is first left until it has reached a sufficient freedom from tack, and a sufficient hardness. The tests are evaluated after a storage time of 24 hours. For the evaluation, the surface of the coating is washed off with aqueous surfactant solution (commercial washing-up detergent) and a soft cloth, in order to remove grease marks. Measurement is always against a standard. The coating is considered satisfactory if there is no visible thumb imprint on the coating film. This test is a measure of the assembly strength of refinishes—the earlier that the coating film has attained its assembly strength after forced drying, the earlier that assembly operations (or disassembly operations to remove adhesive masking) may be commenced on the refinished bodywork.

In each case, the time in minutes is given after which the imprint in the print test after drying at 60° C. for 15 min or drying at 60° C. for 30 min and subsequent storage of the panels for 10 minutes at room temperature is no longer visible.

Drying Recorder:

The coating is drawn down using a 100 μm four-way bar applicator onto glass plates with dimensions of 280 mm×25 mm. With the aid of the Byk Dry-time Recorder, needles are drawn over the film at a defined speed, at room temperature (20-23° C.) and a relative humidity of 40% to 60%. Assessments are made of 3 different phases and also of the total length (i.e., sum of phase 1+phase 2+phase 3) of the track.

Phase 1: the needle track closes up again
Phase 2: the needle track results in a deep furrow in the coating film
Phase 3: the needle causes only superficial damage to the film The assessment is always undertaken against a standard.

In each case the total length of the scratch track in cm and the length of the scratch track in cm in each case after phase 1, 2 and 3 are given.

Potlife:

For this, the viscosity of a paint sample is measured at room temperature in the DIN4 flow cup. Beforehand, the sample is adjusted to a flow viscosity of 19-20 seconds in the DIN4 cup. Thereafter, the increase in viscosity is determined at suitable time intervals. As soon as the sample has doubled its initial viscosity, the potlife limit is reached. In each case the viscosity of the coating material composition measured at room temperature in the DIN4 flow cup directly after preparation thereof and after one, two, three and four hours after preparation thereof are given.

Pendulum Hardness:

The hardness of the paint films is determined by means of pendulum damping according to Koenig in accordance with DIN 53157. The pendulum strikes are reported. The pendulum hardness was measured after storage of the coating for 1 or 3 or 7 days at room temperature, and the pendulum hardness was measured after curing the coating at 60° C. for 30 min and subsequent storage of the coating for 1 or 3 or 7 days at room temperature.

Millbase:

86.4 g of a styrene-containing polyacrylate (62% in Solventnaphta®/ethoxyethyl propionate/methyl isobutyl ketone (20/46/34)) having a molecular weight of 1600-2200 (Mn) and 4000-5000 (Mw), a measured acid number of 12-16 mg KOH/g, a calculated OH number (OHN) of about 130 mg KOH/g (resin solids), and a viscosity of the 60% strength solution in butyl acetate of 200-400 mPa·s, measured using a rotary viscometer (Brookfield CAP 2000, spindle 3, 1000 rpm), are stirred together with 6.4 g of methyl isobutyl ketone, 2.2 g of a commercial light stabilizer mixture composed of UV and HALS light stabilizers and also with 0.15 g of a commercial flow control agent based on a polyacrylate, to form a homogeneous mixture. Added to this mixture, where indicated, is the corresponding catalyst, which is mixed in with stirring. When benzoic acid is used, it is dissolved as a solid in the millbase mixture, with stirring. For adjustment of viscosity, a further 1.0 parts of methyl isobutyl ketone and 2.80 parts of butyl acetate are added.

Curing Agent Solution:

In accordance with WO 2009/077180, a curing agent is prepared according to the following formula, with a degree of conversion of the NCO groups of around 32%-35%:

A 250 ml three-neck flask with stirring magnet, internal thermometer and dropping funnel is charged with a mixture of 51.6 g of a trimerized isocyanurate based on hexamethyl 1,6-diisocyanate (SC 100%) [Desmodur® N 3600, Bayer, Leverkusen], 13.6 g of butyl acetate and 2.4 g of triethyl orthoformate. Under nitrogen blanketing, a mixture of 26.4 g of bis[3-trimethoxysilylpropyl]amine (Dynasylan® 1124, EVONIK, Rheinfelden) and 2.0 g of N-[3-(trimethoxysilyl)propyl]butylamine (Dynasylan® 1189, EVONIK, Rheinfelden) is added slowly dropwise via the dropping funnel. The reaction is exothermic. The rate of addition is selected such that the internal temperature does not exceed a maximum of 60° C. Thereafter a further 4 g of butyl acetate are added via the dropping funnel. The batch is held at 60° C. for four hours more until the titrimetric determination of the isocyanate content (in accordance with DIN EN ISO 11909) gives a constant value of 8.3%-8.8% NCO, based on solids. The molar ratio of Dynasylan® 1124 to Dynasylan® 1189 is 10:1.

Catalyst Based on Amine-blocked Phosphoric Ester (K1):

In accordance with WO 2009/077180, a DABCO-based catalyst was prepared as follows:

Item 1: 11.78 g (0.105 mol) of 1,4-diazabicyclo[2.2.2]octane
Item 2: 32.24 g (0.100 mol) of bis(2-ethylhexyl) phosphate Item 3: 10.00 g of methyl isobutyl ketone
Item 4: 20.00 g of ethyl acetate A 100 ml three-neck flask equipped with reflux condenser and stirrer is charged under nitrogen blanketing with items 1, 3 and 4. At about 45° C., item 4 is slowly added dropwise, during which the temperature is held at not more than 50° C. After further stirring for 3 hours at 40° C., the solvent mixture is removed on a rotary evaporator. The residue is then taken up with isopropanol. This gives a 50% strength solution of the catalyst K1.

Added to this mixture is the corresponding catalyst, which is mixed in with stirring. When benzoic acid is used, it is dissolved as a solid in the millbase mixture beforehand, with stirring. For adjustment of viscosity, a further 1.0 parts of methyl isobutyl ketone and 2.80 parts of butyl acetate are added.

Experimental Procedure:

Additional components such as benzoic acid and catalyst solutions are dissolved in the millbase. Following gentle stirring, clear solutions are obtained. For the implementation of the experiments, the millbase is introduced and the curing agent is added. The solution is homogenized by stirring. For the viscosity measurements, adjustment to the specified viscosity is made by addition of a mixture of methyl isobutyl ketone/butyl acetate in the ratio 1:3. For the glass drawdowns, the viscosity adjustment is not made.

For the drying test, the coating film is drawn down using a 100 μm four-way bar applicator onto glass plates to produce a film thickness of 30-35 μm. For the testing of the pendulum hardness, the film is poured onto glass plates, and before the Koenig film hardness is ascertained, the thickness of the applied film at the score mark (DIN 50933) is measured. For the tests using a drying recorder, the samples are likewise drawn down using a 100 μm four-way bar applicator onto suitable glass strips with length of approximately 300 mm and a width of approximately 25 mm; the film thicknesses achieved thereby are 30-35 μm.

Inventive Example I1 and Comparative Example C1

First of all, the coating materials of inventive example 1 and comparative example C1 were prepared, each with the same amount of phosphorus-based catalyst in accordance with WO 09/077180 but in the inventive example I1 with benzoic acid and in the comparative example C1 without benzoic acid. The composition of these coating materials of inventive example 1 and of comparative example C1, and also the test results on the resultant coatings, are set out in table 1.

TABLE 1

Composition of the coating materials of inventive example I1 and of comparative example C1 in parts by weight, and the test results of the resultant coatings

|  | I1 | C1 |
| --- | --- | --- |
| Millbase | 50 | 50 |
| Benzoic acid | 0.84 | — |
| Catalyst K1 | 0.14 | 0.14 |
| Silanized curing agent | 33.8 | 33.8 |
| Pendulum damping |  |  |
| 1 day RT | 34 | 7 |
| 1 day 15' 60° C. | 20 | 8 |
| 1 day 30' 60° C. | 47 | 10 |
| 3 days RT | 113 | 51 |
| 3 days 15' 60° C. | 111 | 53 |
| 3 days 30' 60° C. | 109 | 53 |
| 7 days RT | 134 | 86 |
| 7 days 30' 60° C. | 118 | 88 |
| Print test 15 min 60° C. | 320 | >360 |
| Print test 30 min 60° C. | 40 | >360 |

Inventive Examples 2 to 4 and Comparative Examples C2 to C4

First of all the coating materials of inventive example 2 and of comparative example C2 were prepared each with the same amount of phosphorus-based catalyst, but with benzoic acid in inventive example B2 and without benzoic acid in comparative example C2. Inventive examples B3 and B4 and comparative examples C3 and C4 differ from inventive example B2 and from comparative example C2, respectively, in higher amounts of phosphoric acid-based catalyst. The composition of these coating materials of inventive examples 2 to 4 and of comparative examples C2 to C4, and also the test results of the resultant coatings, are set out in Table 2.

TABLE 2

Composition of the coating materials of inventive examples B2 to B4 and of comparative examples C2 to C4 in parts by weight and also the test results of the resultant coatings

|  | B2 | B3 | B4 | C2 | C3 | C4 |
| --- | --- | --- | --- | --- | --- | --- |
| Millbase | 50 | 50 | 50 | 50 | 50 | 50 |
| Nacure ® 4167[1)] | 1.85 | 3.7 | 5.55 | 1.85 | 3.7 | 5.55 |
| Benzoic acid | 0.86 | 0.87 | 0.89 | 0 | 0 | 0 |
| Silanized curing agent | 33.8 | 33.8 | 33.8 | 33.8 | 33.8 | 33.8 |
| Total | 85.65 | 87.5 | 89.35 | 85.65 | 87.5 | 89.35 |
| Print test 15' 60° C. [min] | >360 | 60 | 0 | >360 | >360 | 340 |
| Print test 30' 60° C. [min] | 200 | 0 | 0 | >360 | 280 | 140 |
| Zapon tack 15' 60° C. [min] | >270 | >270 | 120 | >270 | >270 | >270 |
| Zapon tack 30' 60° C. [min] | >270 | 80 | 60 | >270 | >270 | 210 |
| Zapon tack RT [min] | >270 | >270 | >270 | >270 | >270 | >270 |
| Pendulum damping 1st day RT | 105 | 104 | 101 | 49 | 62 | 70 |
| Pendulum damping 1st day 15' 60° C. | 112 | 118 | 118 | 53 | 68 | 85 |

TABLE 2-continued

Composition of the coating materials of inventive examples B2 to B4 and of comparative examples C2 to C4 in parts by weight and also the test results of the resultant coatings

|  | B2 | B3 | B4 | C2 | C3 | C4 |
|---|---|---|---|---|---|---|
| Pendulum damping 1st day 30' 60° C. | 121 | 122 | 121 | 59 | 77 | 96 |
| Pendulum damping 7th day RT | 136 | 131 | 130 | 135 | 140 | 137 |
| Pendulum damping 7th day 15' 60° C. | 135 | 142 | 137 | 137 | 140 | 138 |
| Pendulum damping 7th day 30' 60° C. | 143 | 142 | 140 | 137 | 141 | 143 |

[1])Nacure ® 4167 = commercial catalyst based on amine-blocked phosphoric acid partial ester from King Industries, nonvolatile fraction 25%

Discussion of the Test Results

The test results show that amine-blocked phosphoric acid compounds, especially in conjunction with substituted carboxylic acids whose carboxyl group is in conjugation with a π-electron system, such as benzoic acid, are able to accelerate not only 2-component PU curing but also the crosslinking via the condensation of the siloxanes. The examples given also show clearly that in particular the time for sufficient assembly strength of the coating film can be shortened significantly through the addition of substituted carboxylic acids whose carboxyl group is in conjugation with π-electron system, such as benzoic acid.

The invention claimed is:

1. A nonaqueous coating material composition comprising
(A) at least one polyhydroxyl group-containing compound,
(B) at least one polyisocyanate group-containing compound having free or blocked isocyanate groups, wherein the at least one polyisocyanate-group containing compound has at least one structural unit of formula (I)

—NR—(X—SiR"$_x$(OR')$_{3-x}$)  (I), and/or at least one structural unit of formula (II), —N(X—SiR"$_x$(OR')$_{3-x}$)$_n$(X'—SiR"$_y$(OR')$_{3-y}$)$_m$  (II), wherein
R is alkyl, cycloalkyl, aryl or aralkyl, it being possible for the carbon chain to be interrupted by nonadjacent oxygen, sulfur or NRa groups, wherein Ra is alkyl, cycloalkyl, aryl or aralkyl,
R' is hydrogen, alkyl or cycloalkyl, it being possible for the carbon chain to be interrupted by nonadjacent oxygen, sulfur or NRa groups
X, X' are linear and/or branched alkylene or cycloalkylene radical having 1 to 20 carbon atoms,
R" is alkyl, cycloalkyl, aryl, or aralkyl, it being possible for the carbon chain to be interrupted by nonadjacent oxygen, sulfur or NRa groups,
n is 0 to 2, m is 0 to 2, m+n is 2, and x, y are 0 to 2, and
(D) a catalyst comprising at least one phosphoric acid compound blocked with an amine or at least one phosphonic acid compound blocked with an amine, or mixtures thereof, and
(S) at least one monomeric aromatic optionally substituted carboxylic acid comprising a carboxyl group in conjugation with a π-electron system.

2. The coating material composition of claim 1, wherein (S) is selected from benzoic acid, tert-butylbenzoic acid, 3,4-dihydroxybenzoic acid, salicylic acid, acetylsalicylic acid, and combinations thereof.

3. The coating material composition of claim 1, wherein the catalyst (D) is selected from the group of amine-blocked, substituted phosphoric monoesters and phosphoric diesters.

4. The coating material composition of claim 1, wherein the catalyst (D) is selected from the group of amine-blocked phosphoric acid ethylhexyl partial esters and amine-blocked phosphoric acid phenyl partial esters.

5. The coating material composition of claim 1, wherein the amine for blocking the phosphoric acid compound is a cyclic amine.

6. The coating material composition of claim 1, wherein the amine for blocking the phosphoric acid compound is diazabicyclooctane.

7. The coating material composition of claim 1, wherein the coating material composition comprises 0.01% to 20% by weight of at least one amine-blocked phosphoric acid compound and/or at least one amine-blocked phosphonic acid compound as catalyst (D), based in each case on the binder fraction of the coating material composition, and wherein the coating material composition comprises 0.2% to 15.0% by weight of at least one aromatic carboxylic acid (S), the percentages by weight in turn being based in each case on the binder fraction of the coating material composition.

8. The coating material composition of claim 1, wherein between 10 and 90 mol % of the isocyanate groups originally present in component (B) are converted into structural units (I) and/or (II), and the total amount of structural units (I) in component (B) is between 5 and 70 mol %, based in each case on the entirety of the structural units (I) plus (II), and the total amount of structural units (II) in component (B) is between 95 and 30 mol %, based in each case on the entirety of the structural units (I) plus (II).

9. The coating material composition of claim 1, wherein component (B) comprises a polyisocyanate parent structure selected from 1,6-hexamethylene diisocyanate, isophorone diisocyanate, 4,4'-methylenedicyclohexyl diisocyanate, or the isocyanurate trimer thereof, or the allophanate dimer thereof, or the biuret dimer thereof, or the uretdione dimer thereof.

10. The coating material composition of claim 9, wherein component (B) is prepared by reacting the polyisocyanates or the isocyanate trimers thereof or the allophanate dimers thereof or the biuret dimers thereof or the uretdione dimers thereof with at least one compound of formula (Ia)

H—NR—(X—SiR"$_x$(OR')$_{3-x}$)  (Ia)

or with at least one compound of formula (IIa)

HN(X—SiR"$_x$(OR')$_{3-x}$)$_n$(X'—SiR"$_y$(OR')$_{3-y}$)$_m$  (IIa), wherein
- R is alkyl, cycloalkyl, aryl or aralkyl, it being possible for the carbon chain to be interrupted by nonadjacent oxygen, sulfur or NRa groups, wherein Ra is alkyl, cycloalkyl, aryl or aralkyl,
- R' is hydrogen, alkyl or cycloalkyl, it being possible for the carbon chain to be interrupted by nonadjacent oxygen, sulfur or NRa groups,
- X, X' are linear and/or branched alkylene or cycloalkylene radical having 1 to 20 carbon atoms,
- R" is alkyl, cycloalkyl, aryl, or aralkyl, it being possible for the carbon chain to be interrupted by nonadjacent oxygen, sulfur or NRa groups,
- n is 0 to 2, m is 0 to 2, m+n is 2, and x, y are 0 to 2.

11. The coating material composition of claim 1, wherein, in component (B), the total amount of structural units (I) is between 9 and 40 mol % and the total amount of structural units (II) is between 91 and 60 mol %, based in each case on the entirety of the structural units (I) plus (II), and
- between 31 and 50 mol % of the isocyanate groups originally present in component (B) were converted into structural units (I) and (II), and,
- in component (B), between 26 and 35 mol % of the isocyanate groups originally present were converted into structural units (II).

12. The coating material composition of claim 1, wherein the coating material composition comprises from 20% to 80% by weight, based in each case on the binder fraction of the coating material, of at least one hydroxyl-containing polyacrylate (A) and/or at least one hydroxyl-containing polymethacrylate (A), and the coating material composition comprises from 5% to 79% by weight, based in each case on the binder content of the coating material composition, of the compound (B) containing polyisocyanate groups.

13. A multistage coating method, the method comprising applying to an optionally precoated substrate a pigmented basecoat film, followed by applying a film of the coating material composition of claim 1.

14. The multistage coating method of claim 13, wherein application of the pigmented basecoat film is followed first by drying of the applied pigmented basecoat material at temperatures from room temperature to 80° C., and the application of the coating material composition is followed by curing at temperatures between 20 and 80° C.

15. A multicoat color and/or effect paint system comprising at least one pigmented basecoat film and at least one clearcoat film disposed thereon, wherein the clearcoat film is produced from the coating material composition of claim 1.

* * * * *